United States Patent
Roowalla et al.

(10) Patent No.: US 11,641,275 B2
(45) Date of Patent: May 2, 2023

(54) ENCRYPTION KEY ROTATION FRAMEWORK

(71) Applicant: LendingClub Corporation, San Francisco, CA (US)

(72) Inventors: Mohsin Roowalla, Hayward, CA (US); Tianhao Gu, Fremont, CA (US); Pranamya Raghuveer Nayak, Warm Spring, CA (US); Edward Suryadi, San Ramon, CA (US); Roger Santosa Tanuatmadja, Daly City, CA (US); Raul Acevedo, San Francisco, CA (US)

(73) Assignee: LendingClub Bank, National Association, Lehi, UT (US)

( * ) Notice: Subject to any disclaimer, the term of this patent is extended or adjusted under 35 U.S.C. 154(b) by 639 days.

(21) Appl. No.: 16/711,132

(22) Filed: Dec. 11, 2019

(65) Prior Publication Data
US 2021/0184848 A1 Jun. 17, 2021

(51) Int. Cl.
G06F 9/54 (2006.01)
G06F 11/07 (2006.01)
(Continued)

(52) U.S. Cl.
CPC ............ H04L 9/0891 (2013.01); G06F 9/546 (2013.01); G06F 11/076 (2013.01);
(Continued)

(58) Field of Classification Search
CPC ... H04L 9/0891; G06F 16/182; G06F 16/137; G06F 9/546
(Continued)

(56) References Cited

U.S. PATENT DOCUMENTS 7,093,137 B1 * 8/2006 Sato ..................... G06F 21/6227
713/193
8,650,156 B1 * 2/2014 McHugh ................. G06F 12/12
707/638
(Continued)

FOREIGN PATENT DOCUMENTS

CN       102893265 A * 1/2013 ............. G06F 16/22

OTHER PUBLICATIONS

Piotr K.; Hybrid Attribute- and Re-Encryption-Based Key Management for Secure and Scalable Mobile Applications in Clouds; IEEE: 2013; pp. 172-186.*

*Primary Examiner* — Monjur Rahim
(74) *Attorney, Agent, or Firm* — Hickman Becker Bingham Ledesma LLP

(57) ABSTRACT

Techniques are described herein for performing key rotation and key replacement. In an embodiment, a request is received that specifies key names. A first set of messages is generated, where each message identifies a table that is associated with the encrypted-data locations, and stored in a queue for processing by a first plurality of worker processes. Each worker process retrieves a message from the queue and generates a second message that identifies a subset of encrypted data records from the table. Each second message is stored in a distinct queue which is assigned to a worker process of a second plurality of worker processes. Each worker process retrieves the message from the assigned queue, decrypts the subset of encrypted data records, re-encrypts the decrypted data records using a new encryption key that corresponds to a new key name, and stores the re-encrypted data records in a database.

26 Claims, 6 Drawing Sheets

(51) Int. Cl.
  *H04L 9/08* (2006.01)
  *H04L 9/40* (2022.01)
  *G06F 16/182* (2019.01)
  *G06F 11/30* (2006.01)
  *G06F 16/13* (2019.01)

(52) U.S. Cl.
  CPC ........ *G06F 11/3006* (2013.01); *G06F 16/137* (2019.01); *G06F 16/182* (2019.01); *H04L 9/0825* (2013.01); *H04L 63/123* (2013.01)

(58) Field of Classification Search
  USPC .......................................................... 713/165
  See application file for complete search history.

(56) References Cited

U.S. PATENT DOCUMENTS

| | | | | |
|---|---|---|---|---|
| 8,677,083 | B1* | 3/2014 | McHugh | G06F 21/64 711/100 |
| 9,336,092 | B1* | 5/2016 | Li | G06F 21/6209 |
| 11,405,360 | B1* | 8/2022 | Bose | G06F 9/546 |
| 2011/0093710 | A1* | 4/2011 | Galvin | H04L 63/061 713/169 |
| 2012/0140923 | A1* | 6/2012 | Lee | H04L 9/0894 380/44 |
| 2012/0204032 | A1* | 8/2012 | Wilkins | H04L 63/0428 713/170 |
| 2015/0381578 | A1* | 12/2015 | Thota | H04L 9/14 713/168 |
| 2016/0124870 | A1* | 5/2016 | McHugh | G06F 12/1466 711/164 |
| 2018/0356989 | A1* | 12/2018 | Meister | G06F 11/3409 |
| 2019/0050347 | A1* | 2/2019 | Bolotov | G06F 12/1408 |
| 2019/0109713 | A1* | 4/2019 | Clark | H04L 67/104 |
| 2019/0114438 | A1* | 4/2019 | Hersans | G06F 21/602 |
| 2021/0055927 | A1* | 2/2021 | Sarukkai | G06F 8/71 |
| 2021/0091940 | A1* | 3/2021 | Neystadt | H04L 9/0869 |
| 2021/0184848 | A1* | 6/2021 | Roowalla | G06F 11/1438 |
| 2021/0328789 | A1* | 10/2021 | Hosur | H04L 9/0894 |
| 2022/0200800 | A1* | 6/2022 | Xu | G06F 21/6227 |
| 2022/0255762 | A1* | 8/2022 | Dal Zotto | H04L 9/3239 |

* cited by examiner

ENCRYPTION KEY ROTATION FRAMEWORK

FIELD OF THE INVENTION

The technical field to which the present disclosure generally relates is computer software in the field of information security. The technical field also includes secure key rotation for encrypted data in client-server systems.

BACKGROUND

Data records, such as customer data records, can be encrypted using an encryption key and stored in a database in encrypted form. An encryption key may be associated with human readable text that represents an alias of the encryption key, referred to herein as a "key name". In some cases, a key name refers to a single encryption key. In other cases, a key name refers to a version of an encryption key. When a key name refers to a version of an encryption key, there can be multiple versions of the same encryption key. A value can be stored that keeps track of a current version of an encryption key, referred to herein as a "key version". When there are many versions of an encryption key, only the current version of the encryption key can be used to decrypt encrypted data.

In some embodiments, users or services can use the encryption key that was initially used to encrypt data records to decrypt the encrypted data records. Unauthorized users that do not possess the appropriate encryption key will not be able to decrypt the data, even if they find a way to access it. For purposes of data security, an information security operator or administrator may desire to periodically change the encryption keys or versions of encryptions keys that are associated with encrypted data records. The changing of the key names and corresponding encryption keys that are used to encrypt data in a database is referred to herein as "key replacement". The changing the versions of encryption keys that are used to encrypt data in a database is referred to herein as "key rotation".

Performing both key rotation and key replacement may include the steps of decrypting encrypted data records using the encryption key that was used to encrypt the encrypted data records and then re-encrypting the decrypted data records using a new encryption key or new version of an encryption key. For databases that store large amounts of data, rotating or replacing the encryption keys of large amounts of encrypted data records can require a substantial amount of compute resources and a significant amount of time to complete.

In an event such as a security breach where encryption keys are comprised by malicious actors, the time required to re-encrypt all of the data records with new encryption keys or new versions of encryption keys provides a golden opportunity for malicious actors to compromise data. Additionally, current key rotation and replacement techniques require significant database downtime that prevents services and clients of from accessing data stored in a database while such techniques are being performed.

Thus, techniques to quickly and efficiently rotate and replace encryption keys are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for efficiently and expeditiously performing key rotation and key replacement. Specifically, assume a key replacement request is received that specifies to replace encryption keys of encrypted data records in a database. According to one embodiment, a key replacement system that manages the key replacement procedure first determines a set of database tables that include encrypted data records to have their encryption keys replaced. A worker process is assigned to each table and segments each respective table into subsets of encrypted data records. A worker process is assigned to each subset of encrypted data records to decrypt the encrypted data records with an old encryption key and re-encrypt the decrypted data records with a new encryption key. The amount of encrypted data records assigned to each worker process can be configured by an information security administrator such that computing resources for any given system can even distributed with the goal of minimizing system downtown when performing key replacement operations.

Furthermore, techniques are provided for performing key rotation. Assume a key a key rotation request is received that specifies to rotate versions of encryption keys of encrypted data records in a database. According to one embodiment, a key rotation system that manages the key rotation procedure first retrieves encrypted data records that are stored in a database. Each encrypted data record comprises a composite value that includes a key name, key version, and encrypted payload data. The composite values of the encrypted data records are queried to determine if any of the encrypted data records include a key version that matches a source key version specified in the key rotation request. When a matching encrypted data record is found, the encrypted payload data of the encrypted data record is decrypted using an encryption key that corresponds to the source key version. The decrypted payload data is then re-encrypted using a new version of the encryption key. The composite value of the re-encrypted data record is updated to include a reference to the new version of the encryption key.

By representing data records with composite values that include key names, key versions, and encrypted payload data, encrypted data records are provided with enhanced indexing that allows highly granular segmenting of encrypted data records for future access within a row or column of a database table.

System Overview

Figure 1:
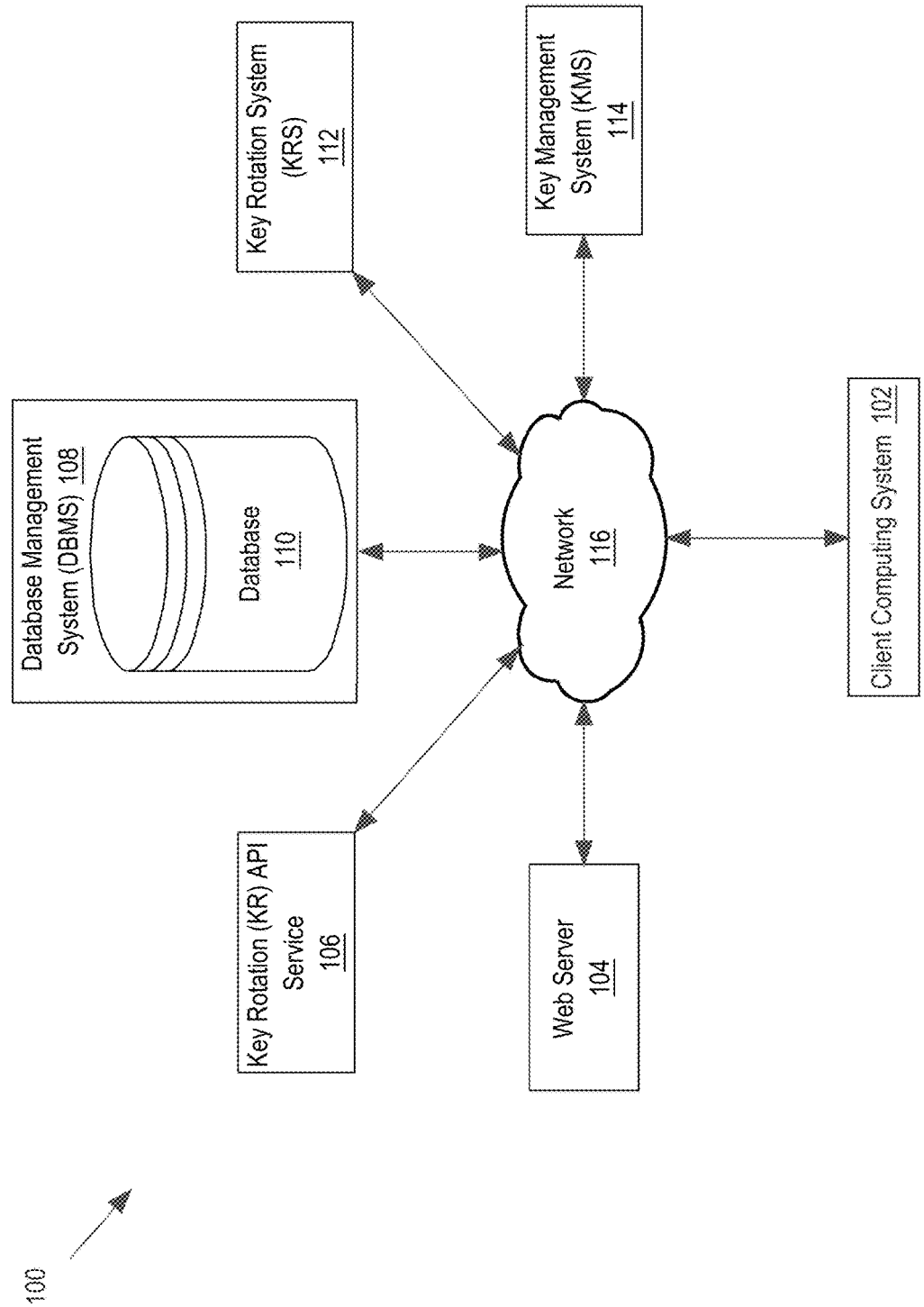
FIG. 1 is a block diagram illustrating a system for encryption key rotation framework, according to an embodiment.

FIG. 1 is a block diagram illustrating a system for encryption key rotation framework. Various devices 102-114 are coupled to a network 116 in the system 100. The network 116 may be an internet, intranet, private network, or any other appropriate network or combination of networks, include other networks described herein.

At least one client computing system 102 is coupled to the network 116. Although a single client computer system 102 is depicted in FIG. 1, in a practical environment there may be many more, perhaps hundreds or thousands, of client computer systems coupled to network 116. Client computer system 102 may execute programmatic instructions that comprise a client application to communicate with other devices of the network 102. For example, a client application executing on client computer system 102 may execute a web browser client to communicate with web server 104, key rotation system (KRS) 112, key rotation (KR) API KR API service 106, database management system (DBMS) 108, and/or key management system (KMS) 114 via network 116.

Web server 104, upon receiving a request from client computing system 102, interacts with KR API service 106, for example, by making a call to an API associated with KR API service 106. KR API service 106 may comprise and execute programmatic instructions to carry out specific tasks associated with the respective service. For example, KR API service 106 may execute a programmatic task to validate and publish key rotation request message to key rotation request queue and store key rotation request state or status in KR API service 106 database. KRS 112 may function as a database client and execute instructions to connect with DBMS 108, transmit digital data to DBMS 108, and issue queries to DBMS 108. Although a single KR API service is depicted in FIG. 1, in a practical environment there may be many more services coupled to network 116.

DBMS 108 may comprise a database server (not shown) and a database 110. DBMS 108 may receive requests to store data records in database 110 from various devices of the system 100. The DBMS 108 may also receive queries for data records that is stored the database 110. A database server associated with DBMS 108 may store data records based on requests to store data records and retrieve data records based on requests to access data records. The database 110 may comprise any appropriate storage, including network attached storage, a shared file system, a database, etc.

Programmatic KMS 114 generates, manages and verifies encryption keys and corresponding key names for devices of the system to access data records from DBMS 108. For example, when storing data records in the DBMS 108, a system device such as web server 104 or KR API service 106 may issue a request to KMS 114 to retrieve an encryption key for use in encrypting the data records. In some embodiments, an encryption key is retrieved from KMS 114 by providing a key name and key version in a request to KMS 114. KMS 114 may use the key name provided in the request to locate a corresponding encryption key that is managed by KMS 114. Additionally, when attempting to access data records stored in DBMS 108, a system device such as the web server 104 or KR API service 106 may communicate with KMS 114 to retrieve an encryption key for decrypting the data records. An example of an enterprise KMS is KeySecure by SafeNet.

KRS 112 may comprise one or more server computers or other computing devices that execute programmatic instructions to perform key rotation and key replacement operations, as discussed herein. KRS 112 may communicate with DBMS 108 to retrieve data records, encrypt data records, decrypt encrypted data records, re-encrypt decrypted data records, and update re-encrypted data records in the DBMS 108. KRS 112 may communicate with KMS 114 to retrieve encryption keys that correspond to key names and key versions provided in a request to KMS 114. Additional details are discussed herein.

Data Record Format

As discussed above, DBMS 108 stores data records in database 110. In one embodiment, each data record (row) comprises a field (column) that contains a composite value. Specifically, according to one embodiment, each data record has a field containing a composite value includes (a) a key name, (b) a key version, and (c) payload data. The key name represents an alias of an encryption key that is used to encrypt the payload data of the data record. The key version specifies a value that identifies a version of an encryption key that is used to encrypt the payload data of the data record. The payload data refers to substantive data of the respective composite value and may represent sensitive consumer data relating to one or more applications or services.

Payload data for a data record may be encrypted using an encryption key that corresponds to the key name and key version included in the composite value of the respective data record. Once the payload data for a data record is encrypted, the data record may be stored in a database and referred to as an "encrypted data record". The payload data of an encrypted data record may be decrypted using an encryption key that corresponds to the key name and key version included in the encrypted data record. Once the payload data of an encrypted data record is decrypted, the data record may be stored in a database and referred to as a "decrypted data record".

As an example, the string "{key,1}cLd5EFRtoeJ5wOtiu0C92w==" represents a composite value of an encrypted data record. The text 'key' is the key name of the composite value. The text '1' is the key version of the composite value. The text 'cLd5EFRtoeJ5wOtiu0C92w==' is the payload data of the composite value. The payload data 'cLd5EFRtoeJ5wOtiu0C92w==' is represented by an encrypted data value.

Location-to-Key-Name Mapping

A location-to-key-name mapping maps the location of data records stored in a database to key names. A location-to-key-name mapping comprises one or more location-to-key-name entries. Each location-to-key-name entry of a location-to-key-name mapping specifies an encrypted-data location and a corresponding key name. For a location-to-key-name entry, the encrypted-data location specifies the location of data records that were encrypted with the encryption that corresponds to the key name from the location-to-key-name entry.

An encrypted-data location may identify a specific column in a specific database table with a specific database schema. The format of an encrypted-data location may be based on a schema associated with a database table and may vary among different database implementations. In some embodiments, an encrypted-data location follows the name convention: "schema_name.table_name.column_name".

An example location-to-key-name entry may specify that 'table$person.firstname' is mapped to 'key1'. In this example of a location-to-key-name entry, the key name is: 'key1', and the data that is encrypted using the encryption key corresponding to that key name resides at encrypted-data location: 'table$person.firstname'. The encrypted-data location specifies the database schema 'table', the database table 'table$person, and the column 'firstname'.

Figure 2:
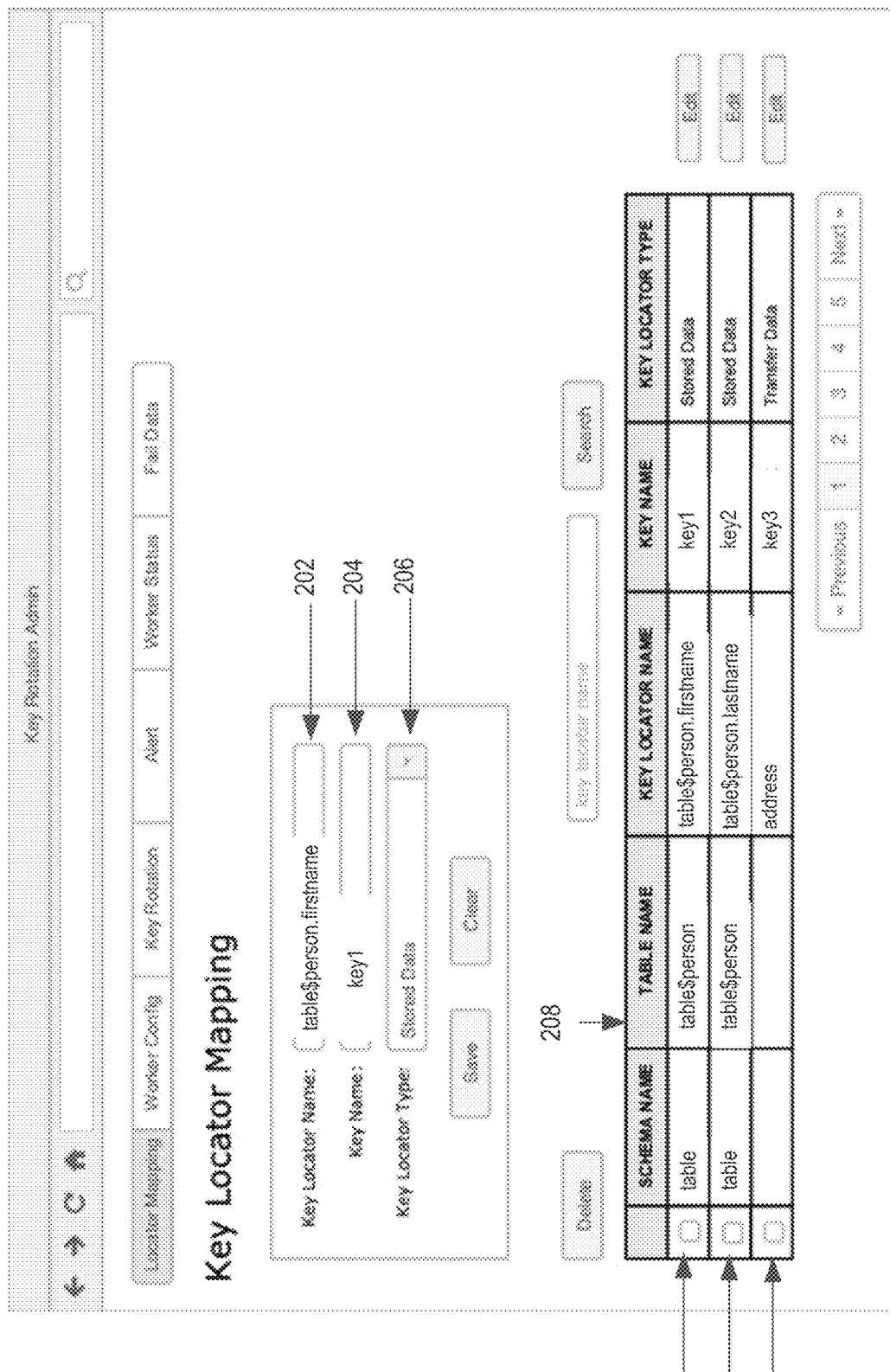
FIG. 2 illustrates a graphical user interface (GUI) that is used to generate a location-to-key-name mapping, according to an embodiment.

A location-to-key-name mapping can be generated by a privileged user such as an information security administrator. FIG. 2 illustrates a graphical user interface (GUI) that is used to generate a location-to-key-name mapping. For example, a privileged user using client computing system 102 or KR API service 106 can enter an encrypted-data location 202, a key name 204, and a key locator type 206 to create an entry in location-to-key-name mapping 208. Location-to-key-name mapping 208 includes three location-to-key-name mapping entries 210, 212, 214. Each location-to-key-name mapping entry 210, 212, 214 includes data fields for a schema name, table name, encrypted-data location (i.e. key locator name in FIG. 2), key name, and key locator type.

For example, location-to-key-name entry 210 includes a 'table' schema name, a 'table$person table name, a 'table$person.firstname' encrypted-data location, a 'key1' key name, and 'Stored Data' key locator type. Thus, location-to-key-name entry 210 indicates that user data located at 'table$person.firstname' is to be encrypted using the encryption key associated with key name "key1".

Location-to-key-name entry 212 includes a 'table; schema name, a 'table$person' table name, a 'table$person.lastname' key locator name, a 'key2' key name, and 'Stored Data' key locator type. Thus, location-to-key-name entry 212 indicates that user data located at 'table$person.lastname' is to be encrypted using the encryption key associated with key name 'key2'. As is clear by entries 210 and 212, the same encryption key (e.g. the encryption key named 'key2') can be used to encrypt data a various locations within the database.

Location-to-key-name entry 214 includes an 'address' key locator name, a 'key3' key name, and 'Transfer Data' key locator type. A location-to-key-name mapping may also be cached for quick access and stored in association with any device of the system of FIG. 1.

Key Rotation

A privileged user such as an information security administrator may generate a key rotation request. The request may specify a source key version that is to be rotated and a target key version that the source key version is to be rotated to. The request may also specify a source key name that is to be rotated and a target key name that the source key name is to be rotated to.

Figure 3:
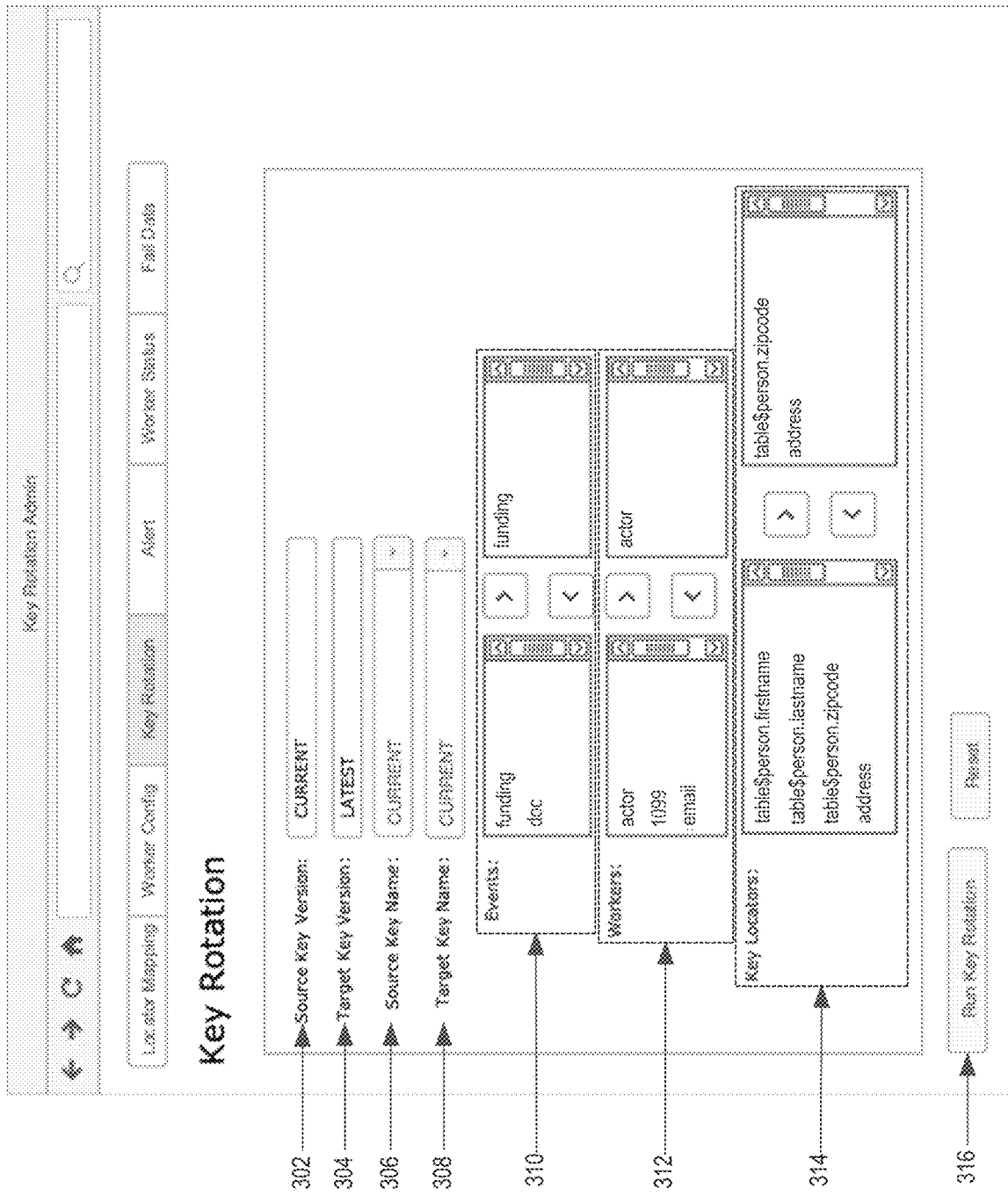
FIG. 3 illustrates a GUI that is used to generate key rotation and key replacement requests, according to an embodiment.

FIG. 3 illustrates a graphical user interface (GUI) that is used to generate a key rotation request. For example, a privileged user using client computing system 102 or KR API service 106 can generate a request to rotate source key versions to target key versions. As shown, Source Key Version: 'CURRENT' 302 is to be rotated to Target Key Version: 'LATEST' 304 and Source Key Name: 'CURRENT' 306 is to be rotated to Target Key Name: 'CURRENT' 308. Such a request indicates that all current key versions of encryption keys should be rotated to target (i.e. new) versions of encryption keys. Because the source key name 306 and target key name 308 are set to the identical values of 'CURRENT', the request indicates that all current key names of all encryption keys should stay the same. A privileged user may also specify specific key versions to rotate. For example, a privileged user may specify to rotate Source Key Version: '1' to Target Key Version: '2'

The GUI shown in FIG. 3 allows a privileged user to select parameters to include in a key rotation request. Additionally, the GUI shown in FIG. 3 allows a privileged user to select events 310, workers (i.e. processes that will execute the desired key rotation procedure) 312, and encrypted-data locations 314 of data records that to include in a request. On selection of 'Run Key Rotation' 316, a key rotation request with the selected parameters is generated.

Once a key rotation request is configured and generated, the request is transmitted to KRS 112 for processing. When KRS 112 receives a key rotation request, KRS 112 parses the request and determines one or more encrypted-data locations. Determining one or more encrypted-data locations may include KRS 112 querying all key names specified in the request against the location-to-key-name mapping stored in DBMS 108 to retrieve one or more encrypted-data locations that are mapped to the key names specified in the request. For example, since the GUI shown in FIG. 3 is configured with the source key name 306 and target key name 308 set to 'CURRENT', all encrypted-data locations in the location-to-key-name mapping will be retrieved because the 'CURRENT' 306 to 'CURRENT' 308 configuration includes all possible key names.

One or more encrypted data records stored at the one or more encrypted-data locations are then retrieved for processing. Composite values associated with each of the one or more encrypted data records are examined to determine the key version of each respective encrypted data record. The key versions of the composite values of the one or more encrypted data records are compared against the key version specified in the request. If the key version specified in the request matches the key version of a composite value of a particular encrypted data record, the particular data record is selected for key rotation. For example, since the GUI shown in FIG. 3 is configured with the source key version 302 set to 'CURRENT' and target key version 304 set to 'LATEST', all data records will be selected for key rotation.

The key name and key version from the composite values of each of the one or more encrypted data records are used to retrieve the corresponding encryption keys from KRS 112 and decrypt each of one or more encrypted data records, thereby generating one or more decrypted data records. For example, for each encrypted data record, the key name and key version from the composite value of the respective encrypted data record is used to retrieve the corresponding encryption key from KRS 112 that is used to decrypt the respective encrypted data record.

The composite values of the one or more decrypted data records are then updated to include the target key version specified in the request. Once the composite values of the one or more decrypted data records are updated, one or more re-encrypted data records are generated by encrypting the one or more decrypted data records using an encryption key that corresponds to the target key version of the respective updated decrypted data record. The one or more re-encrypted data records are then stored at the encrypted-data location that is mapped to the key name of the respective re-encrypted data record.

Key rotation techniques discussed herein provide enhancements over previous techniques. For example, by appending a key version to a composite value of a decrypted or unencrypted data record, data records that are stored in the same table, row, or column in a database can have the same key name, but different key versions. Thus, instead of merely identifying data records by key names, key versions provide another layer of indexing for data records and allow highly granular segmenting of such data records for future access within a row or column of a database table.

Key Replacement

A privileged user such as an information security administrator may generate a key replacement request. The request may specify a source key name that is to be replaced and a target key name that the source key name is to be replaced by.

As discussed above, FIG. 3 illustrates a graphical user interface (GUI) that is used to generate a key replacement request. For example, a privileged user using client computing system 102 or KR API service 106 can generate a request to rotate source key names to target key names. As shown, Source Key Name: 'CURRENT' 306 is to be rotated to Target Key Name: 'CURRENT' 308. In the particular example shown in FIG. 3, because there is no difference between the 'Source Key Name' 306 and 'Target Key Name' 308 fields, performing a key name rotation will have no impact. However, a privileged user may specify to rotate the 'Source Key Name' 306 to any applicable 'Target Key Name' 308.

Parameters such as events 310, workers 312, and encrypted-data locations 314 can be selected to be included in a key replacement request by using the GUI, as discussed with respect to 'Key Version Rotation'. On selection of 'Run Key Rotation' 316, a key replacement request with the selected parameters is generated.

Once a key replacement request is configured and generated, the request is transmitted to KRS 112 for processing. When KRS 112 receives a key replacement request, KRS 112 parses the request and determines one or more encrypted-data locations. Determining one or more encrypted-data locations may include KRS 112 querying all key names specified in the request against the location-to-key-name mapping stored in DBMS 108 to retrieve one or more encrypted-data locations that are mapped to the key names specified in the request.

One or more encrypted data records stored at the one or more encrypted-data locations are then retrieved for processing. In some embodiments, composite values associated with each of the one or more encrypted data records are examined to determine the key name of each respective encrypted data record. The key names of the one or more encrypted data record are used to retrieve the corresponding encryption keys from KRS 112 and decrypt each respective encrypted data record of the one or more encrypted data records, thereby generating one or more decrypted data records.

The composite values of the one or more decrypted data records are then updated to include the target key name specified in the request. Once the composite values of the one or more decrypted data records are updated, one or more re-encrypted data records are generated by encrypting the one or more decrypted data records using an encryption key that corresponds to the target key name of the respective updated decrypted data record. The one or more re-encrypted data records are then stored at the encrypted-data location that is mapped to the key name of the respective re-encrypted data record. An information security administrator using client computing system 102 may update the location-to-key-name mapping so that the existing encrypted-data locations are mapped to the target key names.

Parallelized Key Rotation and Key Replacement

Figure 4:
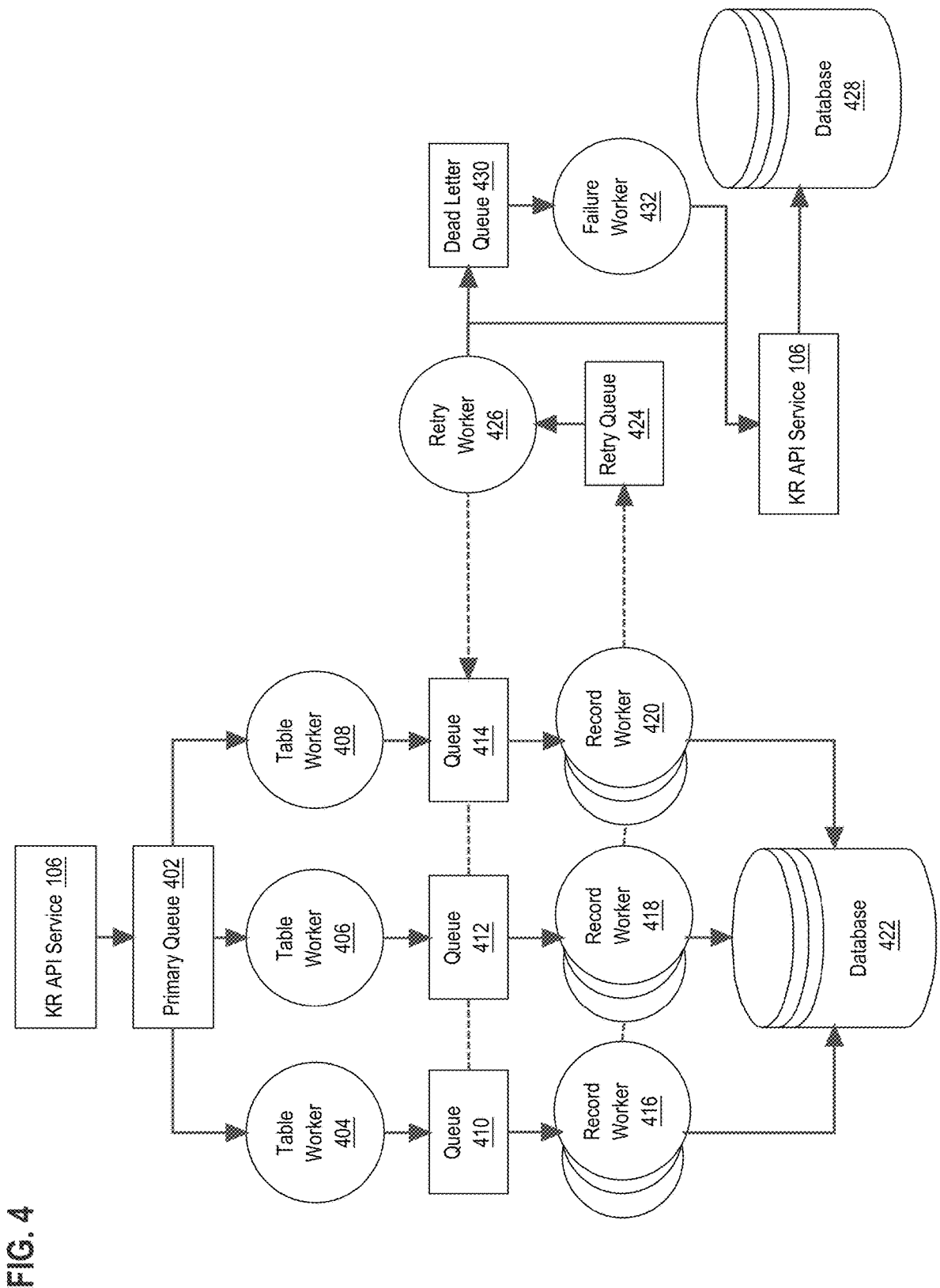
FIG. 4 is a block diagram illustrating a system for parallelized key rotation and key replacement, according to an embodiment.

FIG. 4 is a block diagram illustrating a system for parallelized key rotation and key replacement. The system of FIG. 4 is utilized to perform key rotation and key replacement quickly and efficiently.

The system of FIG. 4 operates by receiving a key rotation or key replacement request at KR API service 106. For a key replacement request, KR API service 106 parses the request and identifies one or more key names included in the request. For a key rotation request, KR API service 106 parses the request and identifies one or more key names and one or more key versions included in the request. KR API service 106 uses the location-to-key-name mapping to determine one or more encrypted-data locations that are mapped to the one or more key names included in the request.

Based on the one or more encrypted-data locations, KR API service 106 generates a first set of messages that includes a message for each table associated with the one or more encrypted-data locations and publishes the first set of messages to primary queue 402. In some embodiments, each message of the first set of messages includes an assignment to a table worker 404, 406, 408. Each table worker 404, 406, 408 comprises one or more processes, such as an instance of programmatic instructions that retrieve or extract the unique IDs of each encrypted data record specified by the location-to-key-name mapping. Each table worker 404, 406, 408 may be executed by separate server computers or all table workers may collectively be executed by a single server computer. Although only three table workers 404, 406, 408 are depicted in FIG. 4, in a practical environment there may be many more, perhaps hundreds or thousands, of table workers.

Each table worker 404, 406, 408 retrieves a message of the first set of messages from primary queue 402, retrieves unique IDs of encrypted data records, and calculates a total count of encrypted data records that are included in the table that is identified in the message that was retrieved by the respective table worker. Each table worker 404, 406, 408 then generates one or more messages of a second set of messages that each identify a subset of encrypted data records that are included in the table that is identified in the message that was retrieved by the respective table worker.

A subset of encrypted data records may identify one or more encrypted data records. An amount of encrypted data records included in a subset of encrypted data records may depend on the amount of records included in the table that is identified in: the message that is assigned to or processed by the respective table worker or a configuration file associated with the respective table worker. An information security administrator may configure an amount of encrypted data records included in each subset of encrypted data records so that systems can adjust and variate the use of available system computing resources.

In some embodiments, each message of the second set of messages includes an assignment to one or more record workers 416, 418, 420. Similar to table workers 404, 406, 408, although only three record workers 416, 418, 420 are depicted in FIG. 4, in a practical environment there may be many more, perhaps hundreds or thousands, of record workers. Each message of the second set of messages is then published by table workers 404, 406, 408 in a respective queue 410, 412, 414.

Each record worker 416, 418, 420 retrieves a message from the second set of messages from queue 410, 412, 414 and queries the database table for the subset of encrypted data records that is identified in the respective message. Each record worker 416, 418, 420 then performs key rotation or key replacement operations on the respective subset of encrypted data records which may include decrypting the respective subset of encrypted data records, updating key names and/or key versions of the decrypted data records, re-encrypting the updated decrypted data records, and updating the re-encrypted data records in database 422. In some embodiments, database 422 may comprise database 110 from FIG. 1.

If a record worker 416, 418, 420 encounters a failure or error during execution, the respective record worker may roll back the entire update, generate and publish a retry message that identifies the failure to retry queue 424. Retry worker 426 may retrieve the retry message and republish the failure message to a queue 410, 412, 414 for retry and store a retry count in database 428. In some embodiments, database 428 may comprise database 422 or database 110 from FIG. 1.

When a maximum number of retries are exhausted, the retry worker will generate and publish a failure message and the corresponding failure message may be published to dead letter queue 430. Failure worker 432 may retrieve the failure message from the dead letter queue 430 and store the failure message in an error table in database 428 for investigation by an information security administrator. After resolving the failure message, the failure message may be published to one of queues 410, 412, 414 to re-process the failure message.

Example Parallelized Key Replacement Procedure

Figure 5:
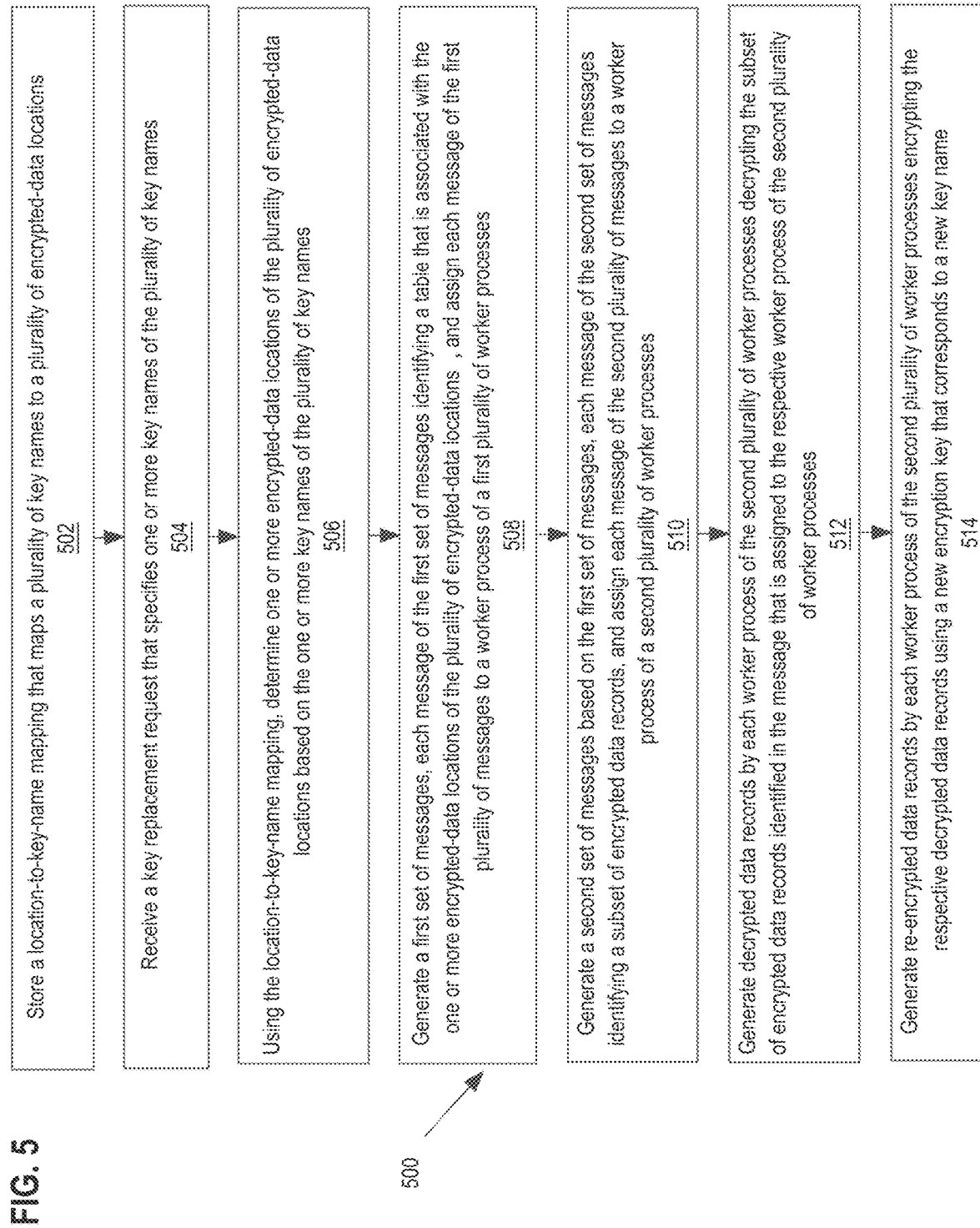
FIG. 5 is a flowchart illustrating steps for parallelized key replacement, according to an embodiment.

FIG. 5 is a flowchart illustrating parallelized key replacement, according to an embodiment. FIG. 5 and each other flow diagram herein illustrates an algorithm or plan that may be used as a basis for programming one or more of the functional modules of FIG. 1 and FIG. 4 that relate to the functions that are illustrated in the diagram, using a programming development environment or programming language that is deemed suitable for the task. Thus, FIG. 5 and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs. For purposes of illustrating a clear example, FIG. 5 and other flow diagrams are discussed in the context of FIG. 1 and FIG. 4, but the algorithms of FIG. 5 and the other flow diagrams also can be implemented in other contexts.

In step 502, a location-to-key-name mapping that maps a plurality of key names to a plurality of encrypted-data locations is stored. For example, a location-to-key-name mapping, as discussed in detail in the section titled 'LOCATION-TO-KEY-NAME MAPPING' herein is created and stored in database 110.

In step 504, a key replacement request is received. The request may specify one or more key names of the plurality of key names. For example, KR API service 106 receives a key replacement request. The request may initially be generated at client computing system 102 or KR API service 106 via GUI by a privileged user such as an administrator as discussed in detail in the section titled 'KEY NAME ROTATION'.

In step 506, using the location-to-key-name mapping, one or more encrypted-data locations of the plurality of encrypted-data locations are determined based on the one or more key names of the plurality of key names. For example, once KR API service 106 parses the key replacement request and determines which encrypted-data locations are mapped to the one or more key names specified in the request received in step 504.

In step 508, a first set of messages is generated. Each message of the first set of messages identifies a table that is associated with the one or more encrypted-data locations of the plurality of encrypted-data locations. In some embodiments, each message of the first set of messages is assigned to a worker process of a first plurality of worker processes. For example, once KR API service 106 determines one or more encrypted-data locations such as in step 506, KR API service 106 generates a message for each of the one or more encrypted-data locations and corresponding table, assigns each message of the first set of messages to a table worker process 404, 406, 408 and publishes the first set of messages to primary queue 402.

In step 510, a second set of messages is generated based on the first set of messages. Each message of the second set of messages identifies a subset of encrypted data records from the table identified in the respective message of the first set of messages. In some embodiments, each message of the second set of messages each is assigned to a worker process of a second plurality of worker processes. For example, each table worker process 404, 406, 408 retrieves a message of the first set of messages from primary queue 402, and based on the respective message, generates one or more messages of a second set of messages that each identify a subset of encrypted data records included in the table identified in the respective message of the first set of messages. Each table worker process may assign each message of the second plurality of messages to a record worker process 416, 418, 410, for example, by storing each message of the second set of messages in queues 410, 412, 414, each of which are associated with one or more record worker processes 416, 418, 420.

In some embodiments, an amount of records included in a subset of encrypted data records may be based on an amount of encrypted data records included in a table identified in a message of the first set of messages. For example, each table worker process 404, 406, 408 retrieves the message of the first set of messages assigned to the respective table worker process 404, 406, 408 from primary queue 402 and determines an amount of encrypted data records included in the table identified in the respective message. To determine an amount of encrypted data records included in the tables identified in the respective message, each respective table worker process 404, 406, 408 may submit queries to each table to determine how many records are in each table.

In step 512, decrypted data records are generated. Decrypted data records are generated by each worker process of the second plurality of worker processes decrypting the subset of encrypted data records identified in the message of the second set of messages that is assigned to the respective worker process of the second plurality of processes. Each decrypted data record is generating by using an encryption key that corresponds to the key name from the composite value of the respective encrypted record that is a target of decryption. For example, each record worker process 416, 418, 420 retrieves the message of the second set of messages assigned to the respective record worker process 416, 418, 420 from queues 410, 412, 414 and generates decrypted data records by decrypting the subset of encrypted data records identified in the respective assigned message.

In step 514, re-encrypted data records are generated. Re-encrypted data records are generated by each worker process of the second plurality of worker processes encrypting the decrypted data records that the respective worker process decrypted in step 512. Each re-encrypted data record is generated by using a new encryption key that corresponds to a new key name to encrypt the decrypted data records that were generated in step 512. For example, each record worker process 416, 418, 420 generates re-encrypted data records by encrypting the decrypted data records that were generated by the respective worker process 416, 418, 420 in step 512.

In some embodiments, the new key names that correspond to the new encryption keys that are used to encrypt the decrypted data records are used to update the location-to-key-name mapping that maps the plurality of key names to the plurality of encrypted-data locations. The update may be initiated and executed by an information security administrator through client computing system 102.

In some embodiments, when a failure or error is detected during steps 512-514, a failure message is generated. The failure message is assigned to a distinct worker process of the second plurality of worker processes for retry. For example, a record worker 416, 418, 420 generates and publishes a failure message that identifies a detected failure to retry queue 424. Retry worker 426 retrieves the failure message and republishes the failure message to queue 410, 412, 414 for retry.

In some embodiments, when a retry message is generated, a retry count is generated based on the retry message and stored in a database. A retry count identifies an amount of times that a particular message, or contents of the particular message, was processed, or attempted to be processed, by a worker process. When it is determined that a retry count for a retry message is greater than a threshold value, a failure message is stored in a database for manual review. For example, retry worker 426 uses KR API service 106 to store a retry count in database 428. When a maximum number of retries are exhausted, retry worker 426 publishes a failure message to dead letter queue 430. Failure worker 432 retrieves the failure message from the dead letter queue 430 and uses KR API service 106 to store the failure message in an error table in database 428 for investigation by an information security administrator. After resolving the failure message, the failure message may be published to one of queues 410, 412, 414 to re-process the failure message.

Using the techniques discusses herein, database system downtime while encryption keys are being rotated or replaced is minimized. By automatically generating and distributing tasks for a resource intensive key rotation or replacement procedure to a scalable amount of processes, a key rotation or replacement procedure can be executed with little to no downtime, which allows database clients continuous, uninterrupted access to data. Additionally, by using distributed and/or parallel processing techniques to distribute a key rotation or replacement workload to multiple processes, a key rotation or replacement procedure can be accomplished efficiently by using less compute, memory, and network bandwidth than previous techniques.

Furthermore, techniques discussed herein for automatically handling and retrying errors and failures detected during the key rotation or replacement procedure provide further enhancements on previous techniques, which previously required manual identification and retrying of exceptions and errors occurring during a key rotation or replacement procedure.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
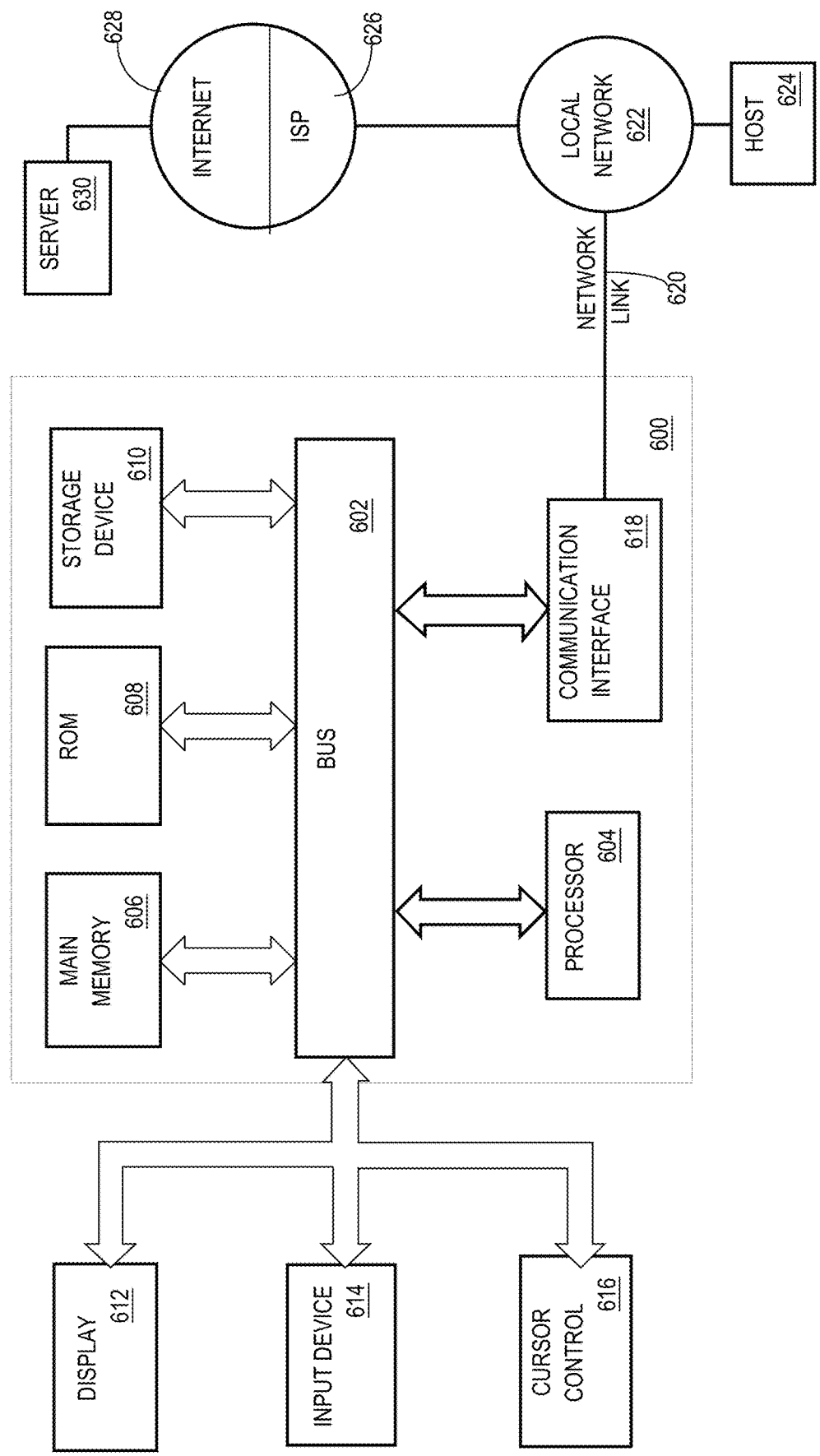
FIG. 6 is a block diagram of a computer system that may be used to implement the techniques described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for key rotation, comprising:
   storing one or more encrypted data records at one or more encrypted-data locations of a plurality of encrypted-data locations;
   wherein each encrypted data record of the one or more encrypted data records comprises a composite value that includes:
      a key version that is unencrypted,
      a payload that has been encrypted with an encryption key, and
      a key name that is unencrypted;
   receiving a key rotation request that specifies one or more key names of a plurality of key names, a source key version, and a target key version;
   for each key name of the one or more key names:
      obtaining a particular encrypted data record of the one or more encrypted data records that is associated with a key name of the one or more key names and the source key version;
      generating a particular decrypted data record by decrypting the payload of the particular encrypted data record using an encryption key that corresponds to the source key version;
      generating a particular re-encrypted data record by encrypting the particular decrypted data record using an encryption key that corresponds to the target key version.

2. The method of claim 1, further comprising:
   storing, in one or more data repositories, a location-to-key-name mapping that maps the plurality of key names to the plurality of encrypted-data locations.

3. The method of claim 2, wherein obtaining the particular encrypted data record of the one or more encrypted data records that is associated with the key name of the one or more key names and the source key version, comprises:

using the location-to-key-name mapping, determining the one or more encrypted-data locations of the plurality of encrypted-data locations based on the one or more key names of the plurality of key names.

4. A computer-implemented method for key replacement, comprising:
generating a first set of messages, each message of the first set of messages identifying a table associated with one or more encrypted-data locations of a plurality of encrypted-data locations;
generating, by each worker process of a first plurality of worker processes, one or more messages of a second set of messages, each of the one or more messages of the second set of messages identifying a subset of encrypted data records included in a table identified in a message of the first set of messages;
generating, by each worker process of a second plurality of worker processes, decrypted data records by decrypting the subset of encrypted data records identified in a message of the second set of messages;
generating, by each worker process of the second plurality of worker processes, re-encrypted data records by encrypting the decrypted data records that were decrypted by the respective worker process of the second plurality of worker processes;
wherein the re-encrypted data records are generating using new encryption keys to encrypt the decrypted data records.

5. The method of claim 4, further comprising:
storing, in one or more data repositories, a location-to-key-name mapping that maps a plurality of key names to the plurality of encrypted-data locations;
receiving a key replacement request that specifies one or more key names of the plurality of key names.

6. The method of claim 5, further comprising:
using the location-to-key-name mapping, determining the one or more encrypted-data locations of the plurality of encrypted-data locations based on the one or more key names of the plurality of key names.

7. The method of claim 5, further comprising:
updating the location-to-key-name mapping with new key names that correspond to the new encryption keys used to encrypt the decrypted data records.

8. The method of claim 4, further comprising:
assigning each message of the first set of messages to a distinct worker process of the first plurality of worker processes;
determining, by each worker process of the first plurality of worker processes, an amount of encrypted data records included in the table identified in the message assigned to the respective worker process of the first plurality of worker processes;
wherein a size of the subset of encrypted data records identified in each of the second set of messages is based on the amount of encrypted data records included in the table identified in the message assigned to the respective worker process of the first plurality of worker processes.

9. The method of claim 4, further comprising:
assigning each message of the second set of messages to a distinct worker process of the second plurality of worker processes;
wherein the decrypted data records generated by each worker process of the second plurality of worker processes are generated by decrypting the subset of encrypted data records identified in the message of the second set of messages that is assigned to the respective worker process of the second plurality of worker processes.

10. The method of claim 4, further comprising:
storing the re-encrypted data records at the one or more encrypted-data locations.

11. The method of claim 4, further comprising:
detecting, by a particular worker process of the second plurality of worker processes, an error while generating the decrypted data records or re-encrypted data records;
generating, by the particular worker process of the second plurality of worker processes, a retry message that identifies the error;
assigning the retry message to a distinct worker process of the second plurality of worker processes for retry.

12. The method of claim 11, further comprising:
generating a retry count based on the retry message and storing the retry count in a database.

13. The method of claim 12, further comprising:
in response to determining that the retry count is greater than a threshold value, generating and storing a failure message in a database for manual review.

14. One or more non-transitory computer-readable media storing instructions which, when executed by one or more processors, cause:
storing one or more encrypted data records at one or more encrypted-data locations of a plurality of encrypted-data locations;
wherein each encrypted data record of the one or more encrypted data records comprises a composite value that includes:
a key version that is unencrypted,
a payload that has been encrypted with an encryption key, and
a key name that is unencrypted;
receiving a key rotation request that specifies one or more key names of a plurality of key names, a source key version, and a target key version;
for each key name of the one or more key names:
obtaining a particular encrypted data record of the one or more encrypted data records that is associated with a key name of the one or more key names and the source key version;
generating a particular decrypted data record by decrypting the payload of the particular encrypted data record using an encryption key that corresponds to the source key version;
generating a particular re-encrypted data record by encrypting the particular decrypted data record using an encryption key that corresponds to the target key version.

15. The one or more non-transitory computer-readable media of claim 14, further comprising instructions for:
storing, in one or more data repositories, a location-to-key-name mapping that maps the plurality of key names to the plurality of encrypted-data locations.

16. The one or more non-transitory computer-readable media of claim 15, wherein obtaining the particular encrypted data record of the one or more encrypted data records that is associated with the key name of the one or more key names and the source key version, comprises:
using the location-to-key-name mapping, determining the one or more encrypted-data locations of the plurality of encrypted-data locations based on the one or more key names of the plurality of key names.

17. One or more non-transitory computer-readable media storing instructions which, when executed by one or more processors, cause:

generating a first set of messages, each message of the first set of messages identifying a table associated with one or more encrypted-data locations of a plurality of encrypted-data locations;

generating, by each worker process of a first plurality of worker processes, one or more messages of a second set of messages, each of the one or more messages of the second set of messages identifying a subset of encrypted data records included in a table identified in a message of the first set of messages;

generating, by each worker process of a second plurality of worker processes, decrypted data records by decrypting the subset of encrypted data records identified in a message of the second set of messages;

generating, by each worker process of the second plurality of worker processes, re-encrypted data records by encrypting the decrypted data records that were decrypted by the respective worker process of the second plurality of worker processes;

wherein the re-encrypted data records are generating using new encryption keys to encrypt the decrypted data records.

18. The one or more non-transitory computer-readable media of claim 17, further comprising instructions for:

storing, in one or more data repositories, a location-to-key-name mapping that maps a plurality of key names to the plurality of encrypted-data locations;

receiving a key replacement request that specifies one or more key names of the plurality of key names.

19. The one or more non-transitory computer-readable media of claim 18, further comprising instructions for:

using the location-to-key-name mapping, determining the one or more encrypted-data locations of the plurality of encrypted-data locations based on the one or more key names of the plurality of key names.

20. The one or more non-transitory computer-readable media of claim 18, further comprising instructions for:

updating the location-to-key-name mapping with new key names that correspond to the new encryption keys used to encrypt the decrypted data records.

21. The one or more non-transitory computer-readable media of claim 17, further comprising instructions for:

assigning each message of the first set of messages to a distinct worker process of the first plurality of worker processes;

determining, by each worker process of the first plurality of worker processes, an amount of encrypted data records included in the table identified in the message assigned to the respective worker process of the first plurality of worker processes;

wherein a size of the subset of encrypted data records identified in each of the second set of messages is based on the amount of encrypted data records included in the table identified in the message assigned to the respective worker process of the first plurality of worker processes.

22. The one or more non-transitory computer-readable media of claim 17, further comprising instructions for:

assigning each message of the second set of messages to a distinct worker process of the second plurality of worker processes;

wherein the decrypted data records generated by each worker process of the second plurality of worker processes are generated by decrypting the subset of encrypted data records identified in the message of the second set of messages that is assigned to the respective worker process of the second plurality of worker processes.

23. The one or more non-transitory computer-readable media of claim 17, further comprising instructions for:

storing the re-encrypted data records at the one or more encrypted-data locations.

24. The one or more non-transitory computer-readable media of claim 17, further comprising instructions for:

detecting, by a particular worker process of the second plurality of worker processes, an error while generating the decrypted data records or re-encrypted data records;

generating, by the particular worker process of the second plurality of worker processes, a retry message that identifies the error;

assigning the retry message to a distinct worker process of the second plurality of worker processes for retry.

25. The one or more non-transitory computer-readable media of claim 24, further comprising instructions for:

generating a retry count based on the retry message and storing the retry count in a database.

26. The one or more non-transitory computer-readable media of claim 25, further comprising instructions for:

in response to determining that the retry count is greater than a threshold value, generating and storing a failure message in a database for manual review.

* * * * *